United States Patent [19]
Griffiths

[11] Patent Number: 5,284,514
[45] Date of Patent: Feb. 8, 1994

[54] APPARATUS FOR COATING FOOD WITH BREAD CRUMBS

[75] Inventor: Sybil M. Griffiths, Winsford, England

[73] Assignee: Eurotaste Limited, England

[21] Appl. No.: 828,660

[22] Filed: Feb. 6, 1992

[30] Foreign Application Priority Data

Feb. 6, 1991 [GB] United Kingdom ............... 9102545

[51] Int. Cl.⁵ .............................................. B05B 5/00
[52] U.S. Cl. ...................................... 118/23; 118/24; 118/608; 118/308; 118/312; 426/518; 99/494; 241/86; 241/88.4; 241/186.35; 241/191
[58] Field of Search ............. 118/19, 23, 24, 308, 118/312, 75, 608; 241/86, 186.35, 191, 88.4; 99/494; 426/518

[56] References Cited

U.S. PATENT DOCUMENTS

| 2,669,924 | 2/1954 | Wiemer | 241/191 |
| 3,463,406 | 8/1969 | Musgrave | 241/86 |
| 3,759,218 | 9/1973 | Korstvedt | 118/24 |
| 4,260,637 | 4/1981 | Rispoli et al. | |
| 4,440,793 | 4/1984 | Seki | |
| 4,936,248 | 6/1990 | Miller | 118/24 |
| 5,052,330 | 10/1991 | Stacy | 118/16 |

FOREIGN PATENT DOCUMENTS

| 76563 | 4/1948 | Czechoslovakia | 241/86 |
| 58835 | 7/1941 | Denmark | 241/86 |
| 0017338 | 1/1980 | European Pat. Off. | |
| 2925516 | 1/1981 | Fed. Rep. of Germany | 426/518 |
| 1223967 | 6/1960 | France | 241/86 |
| WO84/02952 | 8/1984 | PCT Int'l Appl. | 241/186.35 |
| 2039206 | 8/1980 | United Kingdom | |
| 2099277 | 12/1982 | United Kingdom | |
| 2180136 | 3/1987 | United Kingdom | |

Primary Examiner—W. Gary Jones
Assistant Examiner—Todd J. Burns
Attorney, Agent, or Firm—Larson and Taylor

[57] ABSTRACT

The invention concerns an apparatus and process for making foods coated in bread crumbs.

The apparatus has a crumbing apparatus for converting loaves of bread into breadcrumbs; a coating location whereto fresh crumbs are delivered from the crumbing apparatus; and a conveyor for transporting substrate food to the coating location for coating with the crumbs and for transporting coated food away from the coating location.

The process involves the steps of obtaining baked and staled bread; inserting the bread into an apparatus which converts the bread into crumbs and substantially immediately coats the crumbs onto a substrate food. For conversion into crumbs, bread is supported on rods over a rotating drum having teeth which project between the rods to engage the bread. Thus bread too moist for grinding can be crumbed.

10 Claims, 4 Drawing Sheets

APPARATUS FOR COATING FOOD WITH BREAD CRUMBS

BACKGROUND OF THE INVENTION

The present invention relates to bread crumbs. In particular, the invention relates to a process and apparatus for the manufacture of bread crumbs and their coating onto a substrate food such as fish or poultry.

The food manufacturing industry produces bread crumbs for coating many food items, for example fish portions, veal and chicken. The conventional broad crumb is small and gritty. The conventional system for manufacturing this type of crumb uses the steps listed below. In the following discussion and description, all percentages are on a by weight basis.

1. Wheat is made into flour. Typically, the extraction rate is of the order of 76–78%.
2. Flour is baked into bread.
3. The bread is made into crumbs, which contain approximately 30% water.
4. The crumbs are dried to reduce the moisture content to approximately 8–12%.
5. The crumbs are begged.
6. The crumbs are stored.
7. The crumbs are transported.
8. The crumbs are stored.
9. The crumbs are transferred to the hopper of an enrobing machine and coated onto a food product.

Stages 1 to 6 are carried out by a bread crumb manufacturer. Stages 8 and 9 are carried out by the manufacturer of the final product.

For the more sophisticated adult market, there is a need for bigger crumbs that are fresher and have improved qualities, such as texture and taste. To date, it has proved difficult to satisfy this demand, as the use of a fresher bread for creating the crumbs leads to processing problems, for example balling-up of the bread during the crumb producing steps. Furthermore, during transportation and storage, crumbs with a higher moisture content would tend to go mouldy.

SUMMARY OF THE INVENTION

In order to overcome these problems, the present applicants provide a new system for the manufacture of bread crumbs and their use for coating food. Thus, in one aspect the present invention provides a new process and apparatus in which the bread crumbs are made and then substantially immediately coated onto a substrate food. Thus the apparatus provided is able to carry out all the process steps relating to crumb manufacture from loaves of bread and to coating the crumbs onto a substrate food.

In a second aspect the invention provides a process and apparatus for producing bread crumbs which are relatively moist, e.g. having a water content of 25–40% by weight.

In another aspect the invention concerns a process according to the first or second aspects which includes preliminary steps of providing bread to be reduced to crumbs. Such a process may comprise the steps of:

(a) baking bread from flour which has been aged;
(b) staling bread; and
(c) making crumbs from the bread and, substantially immediately, coating the crumbs onto a substrate food.

The flour may be manufactured from wheat at an extraction rate of 59–67%. The flour may be aged for not substantially less than 14 days and the aging may be carried out at ambient humidity at a temperature of 15°–22° C. The bread may be allowed to stale for at least one day. Staling may be at ambient humidity and at a temperature of 15°–22° C. Preferably, the bread should not be allowed to stale for more than 5 days. The resulting crumbs coated on the substrate preferably contain approximately 25–40% of water.

In order that the present invention is more readily understood, an embodiment will now be described in more detail for the purposes of illustration only.

DESCRIPTION OF THE PREFERRED EMBODIMENT

Figure 1:
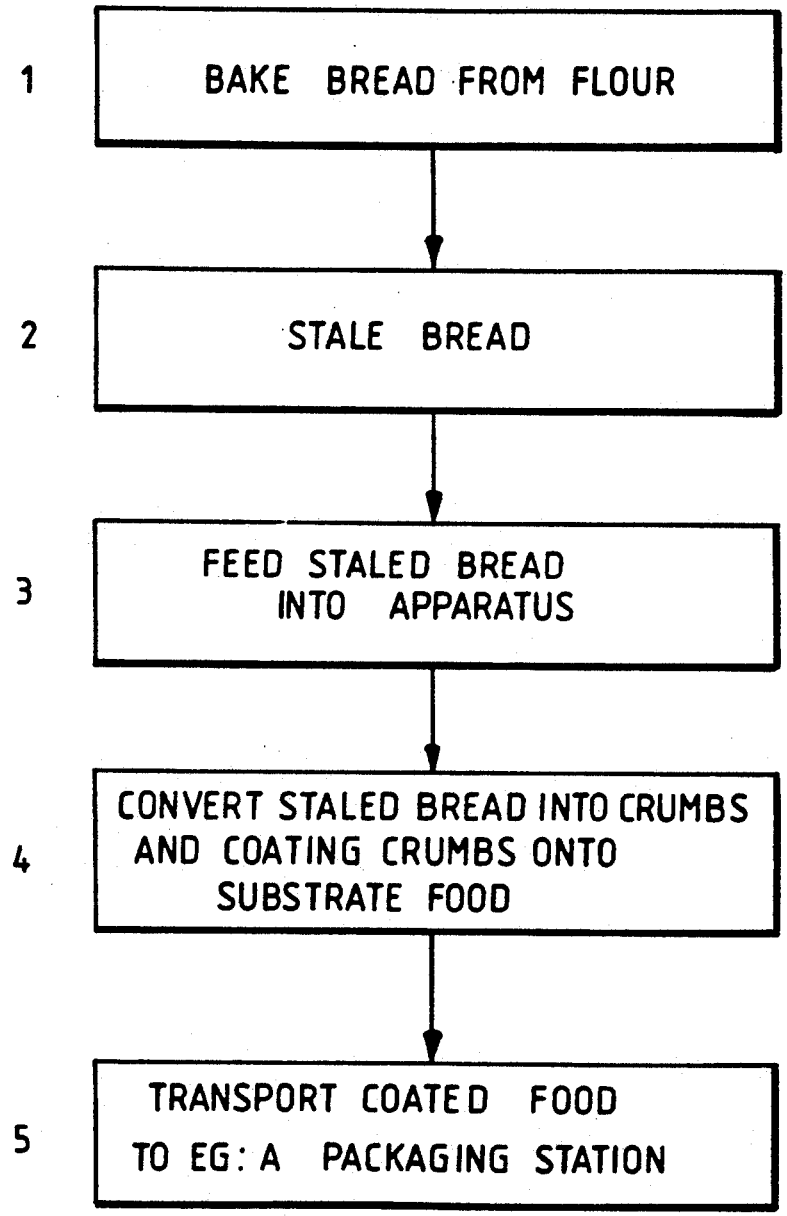
FIG. 1 shows a flow chart of the steps involved in a process for the manufacture of bread crumbs according to the present invention.

A process embodying the present invention for the manufacture and use of bread crumbs, uses the steps 1 to 5 shown in FIG. 1 and described in more detail below.

1. Bread is baked from flour. Typically the flour is made from wheat at an extraction rate of 59–67% and then aged for at least 14 days, at a temperature of 15°–22° C. and at ambient humidity.
2. The bread is allowed to stale. Typically the bread is staled for a minimum of 1 day at a temperature of 15°–22° C. and at ambient humidity. Preferably, the bread should not stale for longer than 5 days.
3. The staled bread is fed into the crumb-producing part of the apparatus described in more detail below.
4. The apparatus is operated to convert the bread into crumbs and to coat the crumbs as they are produced onto a substrate food.
5. The coated food is then transported away from the apparatus to e.g. a packaging station.

The crumbs produced and applied by the operation of such a process contain approximately 25–40% water. They are large with a low bulk density and improved eating characteristics as compared to the bread crumb which results from operation of the conventional system. Since crumb production and coating are carried out almost simultaneously, the food manufacturer no longer needs to obtain ready prepared crumbs from a bread crumb manufacturer. For example, the food manufacturer may simply obtain ready baked bread (in which case the food manufacturer does not carry out step 1 and optionally step 2) or, alternatively, he may manufacture his own bread (in which case the manufacturer carries out steps 1 to 5). Thus, the system is advantageous as it is economic to operate in terms of time and cost.

Figure 2:
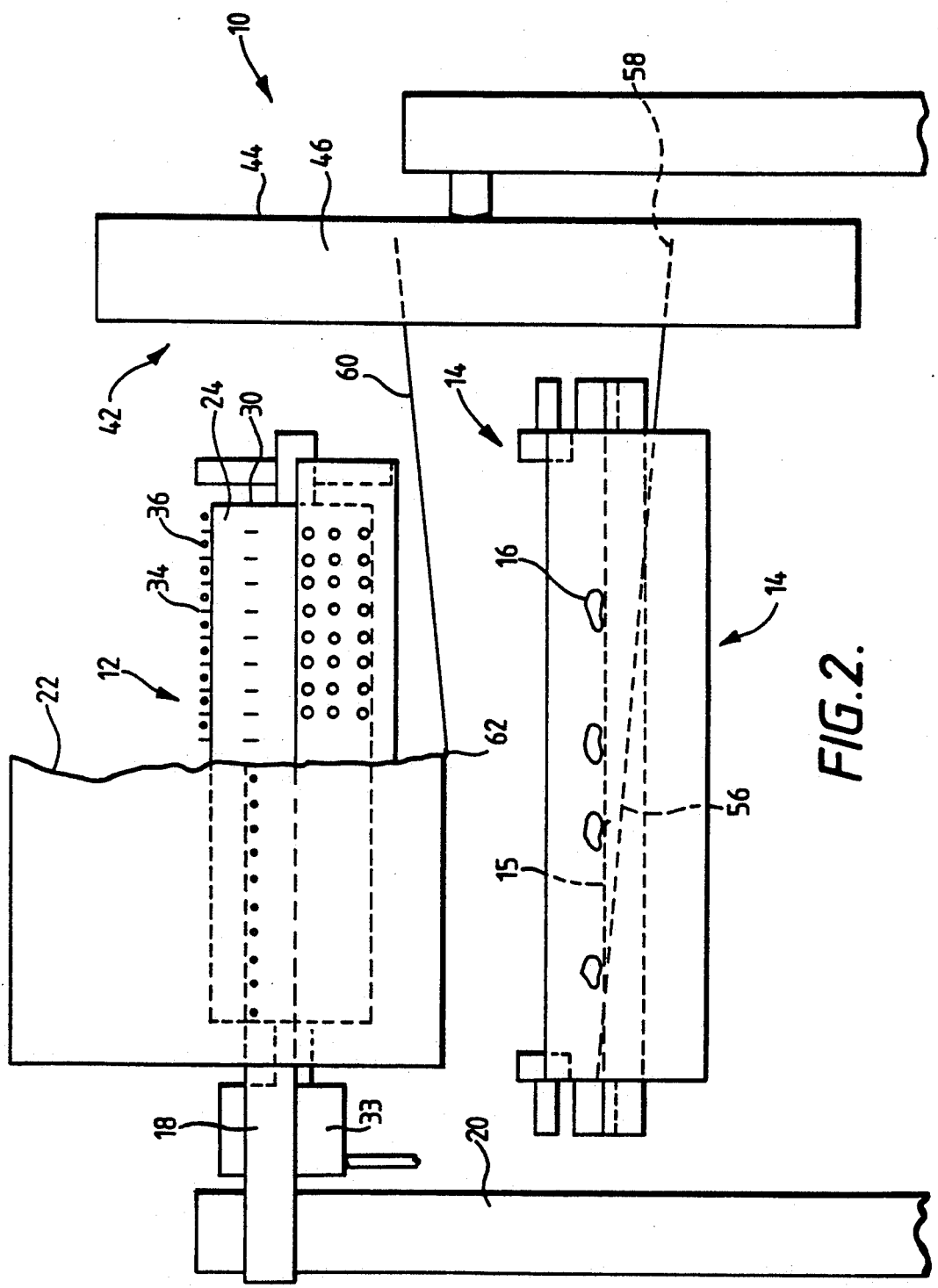
FIG. 2 is a diagrammatic end-on view of an apparatus for the manufacture and coating of bread crumbs and the coating of food therewith.
Figure 3:
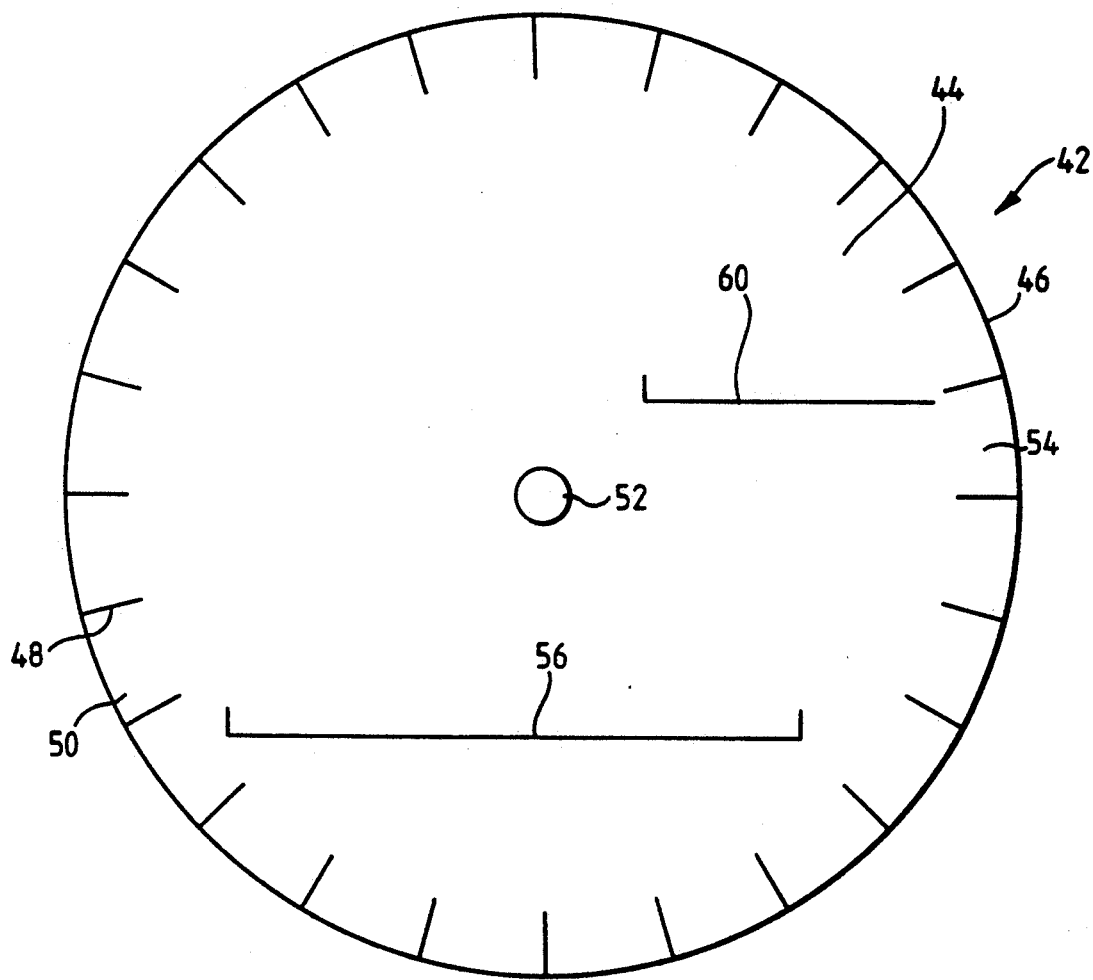
FIG. 3 is a diagrammatic view of a face of the wheel in the apparatus shown in FIG. 2 which functions to recirculate bread crumbs not coated onto a substrate food.
Figure 4:
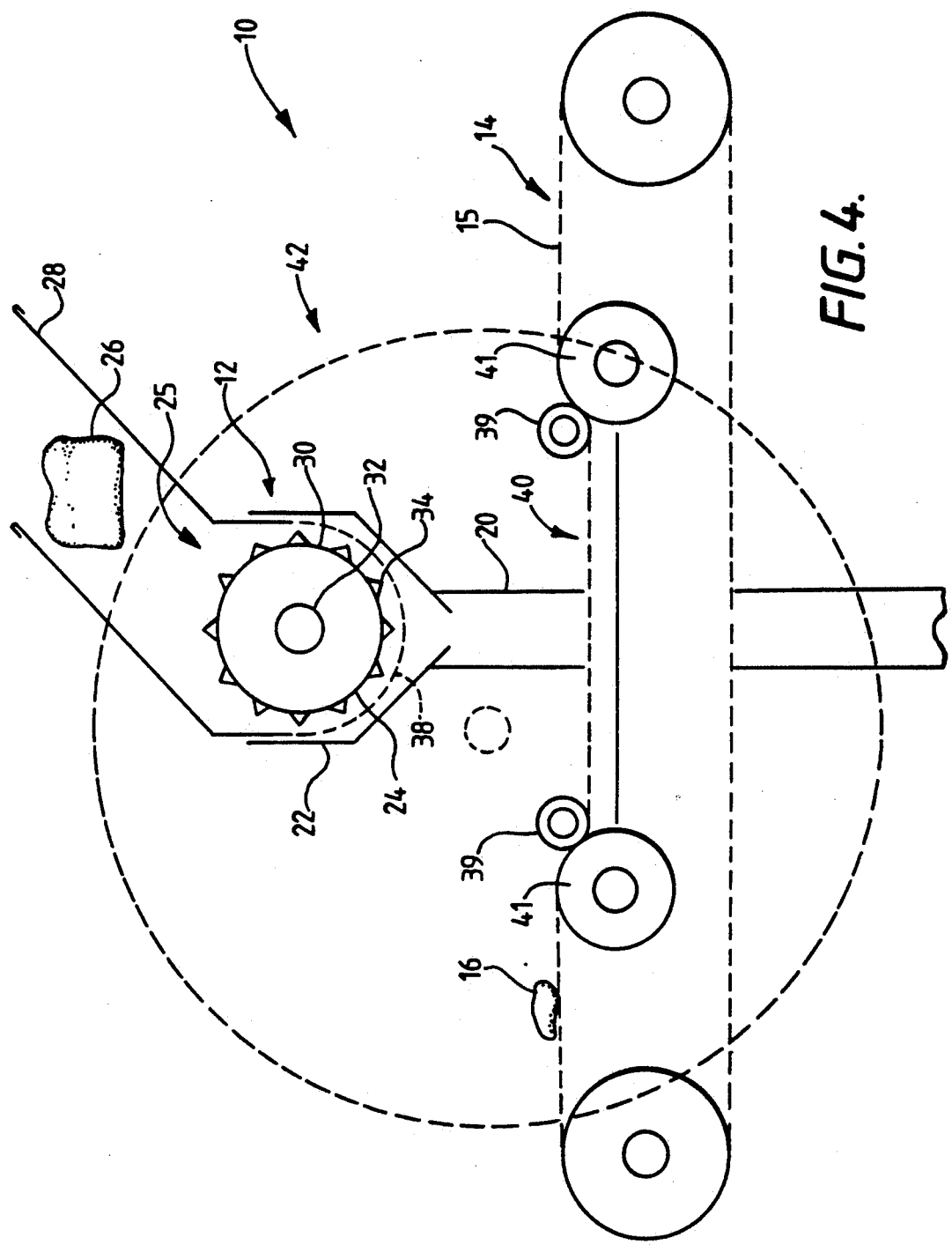
FIG. 4 is a diagrammatic side view of the apparatus shown in FIG. 2.

The apparatus for carrying out step 4 of the process is shown in FIGS. 2, 3 and 4.

The apparatus 10 has a food conveyor system 14, in this example comprising a conveyor belt 15, for conveying food through a crumb producing and coating station. This includes a crumb producing apparatus 12 cantilevered over the belt 15. The conveyor system 14 transports pieces of substrate food 16 beneath the crumb producing apparatus 12 to be coated in freshly produced bread crumbs.

The crumb producing apparatus 12 is cantilevered over a portion of the conveyor belt 15 by at least one arm 18 which is swivellably mounted upon an upright supporting post 20 located to one side of the conveyor belt 15, The swivellable mounting of the arm 18 upon the post 20 is such that the crumb producing apparatus 12 can be partially rotated around the swivellable mounting in either a vertical or horizontal plane. Either type of rotation will allow an operator to alter the width of belt overlain by crumb producing apparatus 12. Thus it can be adapted to different belt widths.

The crumb producing apparatus 12 has a casing 22 which houses the mechanism 24. Loaves of bread 26 are fed into an inlet 25 of the casing 22, via a chute 28. The chute 28 is longer than a human arm in order to protect an operator's hand from the mechanism 24.

The mechanism 24 is in the form of drum 30 which is rotatable about a central axis 32 by a motor 33. A plurality of teeth 34 project outwardly from the cylindrical surface of the drum 30. In the embodiment being described, the teeth 34 are arranged in a spiral around the drum 30. They may be provided by a toothed strip (as used for bandsaws) which has been secured to the drum surface, e.g. by welding. Other forms of teeth may alternatively be used. For example, the teeth 34 could be replaced with spikes.

The loaves of bread 26 being converted into crumbs are held a short distance away from the drum 30 by a plurality of spaced apart rods 36 which extend across the inlet 25 of the casing to provide a platform just above the drum 30. The teeth 34 can project between adjacent rods in order to bite off small crumbs from the loaves of bread 26. Thus crumbs are generated by a "pecking" action, which can operate perfectly well even with quite moist bread, which could not be comminuted by a conventional grinder.

Loaves of bread being converted into crumbs are kept in engagement with the teeth 34 of the drum 30, by virtue of their own weight and the weight of other loaves 26 of bread in the chute 28.

A mesh 38 is located within the casing 22 beneath the drum 30. It is arcuate and spaced slightly from the teeth 34. The mesh 38 functions to screen for a desired crumb size, i.e. it only allows crumbs of a given size or less to pass through and coat the substrate food 16. The mesh 38 is removable, so that it can be replaced with a different mesh. This enables an operator to select and control the size of crumb for coating a particular substrate food.

As they are produced, the crumbs fall into a trough-like depression 40 defined in the conveyor belt 15 by pairs of nip rolls 39, 41. (The upper nip rolls 39 engage only edge regions of the belt 15 so as not to interfere with the transport of food items). The trough-like depression 40 is located immediately beneath the crumb producing apparatus 12 and provides a coating location. Pieces of substrate food 16 moving along the conveyor belt 15 fall onto the crumbs in the trough-like depression 40. This coats a lower surface of the substrate food 16 with crumbs. Whilst in the trough-like depression 40, exposed surfaces of the substrate food 16 are coated by crumbs falling directly upon it from the crumb producing apparatus. The conveyor belt 15 can be made of a chain or mesh e.g. a cross-link belt. Excess crumbs not used for coating drop through the belt 15 onto a sloping tray 56 and are re-circulated for coating.

The crumbs are re-circulated by a wheel 42 shown in FIGS. 2 and 4 and in FIG. 3 in more detail. The wheel 42 is substantially like a water-wheel. It has the form of a shallow drum with a horizontal axis. It has a circular back-wall 44 and a cylindrical side-wall 46. A plurality of short radial vanes 48 or cups are spaced around the rim 50 of the wheel 42, connected to the back 44 and circumferential 46 walls.

The wheel 42 is located to one side of the conveyor system 14 and substantially opposite the post 20 supporting the bread grinding station 12. The vanes 48 of the wheel 42 point towards the conveyor system 14. The tray 56 which is located beneath the conveyor belt 15 to capture crumbs falling through slopes downwardly away from the conveyor belt 15 towards the wheel 42. A lowermost edge 58 of the tray 56 ends slightly spaced from the back-wall 44 and beneath the hub 52 and above the lowermost vanes 48 of the wheel 42. Crumbs fall from the edge 58 of the tray 56 into the rotating wheel 42. As the wheel rotates, the vanes are loaded with crumbs from the tray, are raised and gradually inverted. The crumbs fall out and onto a slide 60 which is located above and inclines towards the conveyor belt 15. The start of the slide 60 is slightly spaced from the backwall 44 and above the hub 52 and below the uppermost vanes 48 of the wheel 42. The spacing from the backwall 44, prevents the slide from impeding the rotation of the wheel. The crumbs then pass down the slide 60 and fall off its end 62 located above the trough-like depression 40 of the conveyor belt 15. Hence, the crumbs fall back onto the conveyor belt 15 at the coating location.

While the invention has been described above with reference to a preferred embodiment, it will be understood by those skilled in the art that various changes can be made without departing from the spirit and scope of the invention and it is intended to cover all such changes and modifications by the accompanying claims.

I claim:

1. An apparatus for coating food with breadcrumbs which comprises
    a crumbing apparatus for converting unground bread into breadcrumbs, which crumbing apparatus comprises a casing which houses a rotatable drum with an outer cylindrical drum surface from which a plurality of teeth project and a plurality of spaced apart rods arranged to provide a platform for bread closely spaced above the drum surface, such that teeth project between pairs of adjacent rods;
    a coating station adjacent said apparatus for receiving freshly made crumbs from the crumbing apparatus;
    conveyor means arranged to transport substrate food to the coating station for coating with the freshly made crumbs and to transport coated food away from the coating station.

2. Coating apparatus according to claim 1 wherein the crumbing apparatus is located above the coating stations so that freshly ground crumbs fall from the crumbing apparatus into the coating station.

3. Coating apparatus according to claim 1 or claim 2 wherein the conveyor means comprises a conveyor belt and the coating station includes means constraining the conveyor belt to follow a path defining a trough-like depression thereat.

4. Coating apparatus according to claim 1 wherein the teeth are disposed in a spiral path around the cylindrical drum surface.

5. Coating apparatus according to claim 1 wherein the crumbing apparatus comprises a replaceable mesh through which crumbs must pass to reach the coating station, for ensuring only crumbs of a desired size range are delivered to said station.

6. Coating apparatus according to claim 1 which further comprises a chute for delivery of unground bread to the crumbing apparatus.

7. Coating apparatus according to claim 1 which further comprises a crumb re-circulating system for collecting crumbs not coated onto a substrate food and for returning the collected crumbs to the coating station.

8. Coating apparatus according to claim 7 wherein the re-circulatory system comprises a lifting wheel having a vertically extending axis and a multiplicity of carriers adjacent its periphery; said wheel being arranged to receive crumbs in the carriers at a lower region and to rotate, thus lifting the crumbs to an upper region where they fall from the carrier and are returned to the coating station.

9. Crumbing apparatus for producing crumbs from bread, said apparatus comparing a casing which houses a rotatable drum with a cylindrical drum surface from which a plurality of teeth project; and a plurality of spaced apart rods arranged to provide a platform for bread closely spaced above the drum surface such that teeth project between pairs of adjacent rods in order to bite off small crumbs from the bread.

10. Crumbing apparatus according to claim 9 further includes means defining an exit path for crumbs and a replaceable mesh mounted to intersect said path to control the size of exiting crumbs.

* * * * *